United States Patent
Kim et al.

(10) Patent No.: US 11,634,786 B2
(45) Date of Patent: *Apr. 25, 2023

(54) NON-ORIENTED ELECTRICAL STEEL SHEET AND METHOD FOR PREPARING SAME

(71) Applicant: POSCO, Pohang-si (KR)

(72) Inventors: Jae-Hoon Kim, Pohang-si (KR); Geun Ha Jun, Pohang-si (KR); So Hyun Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 102 days.

This patent is subject to a terminal disclaimer.

(21) Appl. No.: 16/958,351

(22) PCT Filed: Sep. 10, 2018

(86) PCT No.: PCT/KR2018/010568
§ 371 (c)(1),
(2) Date: Jun. 26, 2020

(87) PCT Pub. No.: WO2019/132172
PCT Pub. Date: Jul. 4, 2019

(65) Prior Publication Data
US 2021/0062287 A1 Mar. 4, 2021

(30) Foreign Application Priority Data

Dec. 26, 2017 (KR) .................. 10-2017-0180073

(51) Int. Cl.
| | | |
|---|---|---|
| *C21D 9/46* | (2006.01) | |
| *C21D 8/12* | (2006.01) | |
| *C21D 6/00* | (2006.01) | |
| *C22C 38/60* | (2006.01) | |
| *C22C 38/02* | (2006.01) | |
| *C22C 38/06* | (2006.01) | |
| *C22C 38/00* | (2006.01) | |
| *H01F 1/147* | (2006.01) | |

(52) U.S. Cl.
CPC .............. *C21D 9/46* (2013.01); *C21D 6/008* (2013.01); *C21D 8/1222* (2013.01); *C21D 8/1233* (2013.01); *C21D 8/1272* (2013.01); *C22C 38/002* (2013.01); *C22C 38/008* (2013.01); *C22C 38/02* (2013.01); *C22C 38/06* (2013.01); *C22C 38/60* (2013.01); *H01F 1/14775* (2013.01)

(58) Field of Classification Search
CPC .......... C21D 6/00; C21D 6/008; C21D 8/12; C21D 8/1222; C21D 8/1233; C21D 8/1272; C21D 9/46; C22C 38/00; C22C 38/002; C22C 38/004; C22C 38/008; C22C 38/02; C22C 38/04; C22C 38/06; C22C 38/60; H01F 1/14775
See application file for complete search history.

(56) References Cited

U.S. PATENT DOCUMENTS

| 11,060,170 B2 * | 7/2021 | Kim ..................... C22C 38/004 |
| 2017/0362677 A1 | 12/2017 | Kim et al. |
| 2018/0230564 A1 * | 8/2018 | Nakajima ............ C21D 8/1283 |
| 2020/0080175 A1 * | 3/2020 | Kim ....................... C22C 38/02 |

FOREIGN PATENT DOCUMENTS

| EP | 3184661 A1 | 6/2017 |
| JP | H05-125495 A | 5/1993 |
| JP | H05125495 A * | 5/1993 |
| JP | H08-041603 A | 2/1996 |
| JP | 2581335 B2 | 2/1997 |
| JP | 2008-308704 A | 12/2008 |
| JP | 2009-299102 A | 12/2009 |
| JP | 2009299102 A * | 12/2009 |
| JP | 5126788 B2 | 1/2013 |
| JP | 2018-507958 A | 3/2018 |
| KR | 10-0421685 B1 | 3/2004 |
| KR | 10-2008-0027913 A | 3/2008 |
| KR | 10-2014-0060727 A | 5/2014 |
| KR | 10-2015-0126333 A | 11/2015 |
| KR | 10-2015-0126334 A | 11/2015 |
| KR | 10-1701194 B1 | 2/2017 |
| KR | 10-2017-0032429 A | 3/2017 |
| KR | 10-2018-0070949 A | 6/2018 |
| KR | 10-2018-0070950 A | 6/2018 |
| KR | 10-2019-0077892 A | 7/2019 |

(Continued)

OTHER PUBLICATIONS

Extended European Search Report dated Aug. 17, 2020 issued in European Patent Application No. 18897465.3.
Japanese Office Action dated Jun. 8, 2021 issued in Japanese Patent Application No. 2020-536265.
International Search Report dated Dec. 21, 2018 issued in International Patent Application No. PCT/KR2018/010568 (with English translation).

* cited by examiner

*Primary Examiner* — Jenny R Wu

(74) *Attorney, Agent, or Firm* — Morgan, Lewis & Bockius LLP

(57) ABSTRACT

A non-oriented electrical steel sheet according to an exemplary embodiment of the present invention includes, by weight, Si: 2.0 to 3.5%, Al: 0.3 to 2.5%, Mn: 0.3 to 3.5%, Sn: 0.0030 to 0.2%, Sb: 0.0030 to 0.15%, P: 0.0040 to 0.18%, individually or in a total amount of 0.0005 to 0.03% of at least one of Ga and Ge, and a remainder including Fe and unavoidable impurities, and satisfies Equation 1 below.

$$0.05 \leq ([Sn]+[Sb])/[P] \leq 25 \quad \text{[Equation 1]}$$

([Sn], [Sb], and [P] respectively represent the content (% by weight) of Sn, Sb, and P.)

12 Claims, No Drawings

(56) References Cited

FOREIGN PATENT DOCUMENTS

| KR | 10-2019-0078385 A | 7/2019 | |
|----|---|---|---|
| WO | 2016/027565 A1 | 2/2016 | |
| WO | 2017/022360 A1 | 2/2017 | |
| WO | 2017/099534 A1 | 6/2017 | |
| WO | WO-2018117598 A1 * | 6/2018 | ............ C21D 8/021 |

NON-ORIENTED ELECTRICAL STEEL SHEET AND METHOD FOR PREPARING SAME

CROSS-REFERENCE OF RELATED APPLICATIONS

This application is the U.S. National Phase under 35 U.S.C. § 371 of International Patent Application No. PCT/KR2018/010568, filed on Sep. 10, 2018, which in turn claims the benefit of Korean Application No. 10-2017-0180073, filed on Dec. 26, 2017, the entire disclosures of which applications are incorporated by reference herein.

TECHNICAL FIELD

The present disclosure relates to a non-oriented electrical steel sheet and a manufacturing method thereof. Specifically, the present disclosure relates to a non-oriented electrical steel sheet having high magnetic permeability, low high-frequency iron loss, and high magnetic flux density by mutually controlling a content of segregation elements included in the steel sheet, and a manufacturing method thereof.

BACKGROUND ART

Recently, as awareness of eco-friendly automobiles has increased to reduce the generation of fine particulates and greenhouse gas emissions, there has been a rapid increase in demand for non-oriented electrical steel sheets used for automobile driving motors. Unlike conventional internal combustion engine vehicles using engines, engines for environmentally friendly vehicles (hybrid, plug-in hybrid, electric, and fuel cell vehicles) are replaced by driving motors. In addition, various motors other than driving motors are required. The driving range of eco-friendly vehicles is closely related to the efficiency of various motors including driving motors, and the efficiency of these motors is directly related to the magnetism of the electrical steel sheet. Therefore, in order to increase the driving range, it is necessary to use a non-oriented electrical steel sheet which is excellent in magnetic properties. Since a driving motor of an automobile must exhibit excellent characteristics in all areas ranging from low speed to high speed, unlike normal motors, it is necessary to output a large torque at a low speed or during acceleration, and decrease a loss at a constant speed or at high speed driving. In order to obtain such characteristics, a non-oriented electrical steel sheet which is a motor iron core material must have a large magnetic flux density characteristic at low speed rotation and a small high frequency iron loss at high speed rotation. Moreover, high mechanical strength is required because it must withstand the centrifugal force generated during high speed rotation. In order to obtain high frequency low iron loss and high magnetic flux density characteristics in the electrical steel sheet, the magnetic field must have high permeability and a low coercive force. For this, it is essential to control the texture of the steel sheet. Although many studies have been conducted on magnetic changes due to changes of a specific resistance element and an impurity element, studies on simultaneous addition of trace elements such as Ga and Ge and segregation elements such as Sn, Sb, and P have not been conducted.

DISCLOSURE

Description of the Drawings

A non-oriented electrical steel sheet and a manufacturing method thereof are provided. Specifically, by simultaneously controlling the content of Ga and Ge, and the content of the segregation element such as Sn, Sb, P, etc., the non-oriented electrical steel sheet with high magnetic permeability, low high frequency iron loss, and high magnetic flux density, and the manufacturing method thereof, are provided.

A non-oriented electrical steel sheet according to an exemplary embodiment of the present invention includes, by weight, Si: 2.0 to 3.5%, Al: 0.3 to 2.5%, Mn: 0.3 to 3.5%, Sn: 0.0030 to 0.2%, Sb: 0.0030 to 0.15%, P: 0.0040 to 0.18%, individually or in a total amount of 0.0005 to 0.03% of at least one of Ga and Ge, and a remainder including Fe and unavoidable impurities, and satisfies Equation 1 below.

$$0.05 \leq ([Sn]+[Sb])/[P] \leq 25 \quad \text{[Equation 1]}$$

([Sn], [Sb], and [P] respectively represent the content (% by weight) of Sn, Sb, and P.)

The non-oriented electrical steel sheet according to an exemplary embodiment of the present invention may further include one or more of N: 0.0040% or less (excluding 0%), C: 0.0040% or less (excluding 0%), S: 0.0040% or less (excluding 0%), Ti: 0.0030% or less (excluding 0%), Nb: 0.0030% or less (excluding 0%), and V: 0.0040% or less (excluding 0%).

The non-oriented electrical steel sheet according to an exemplary embodiment of the present invention may satisfy Equation 2 below.

$$0.2 \leq ([Si]+[Al]+0.5\times[Mn])/(([Ga]+[Ge])\times 1000) \leq 5.27 \quad \text{[Equation 2]}$$

([Si], [Al], [Mn], [Ga], and [Ge] respectively represent the content (% by weight) of Si, Al, Mn, Ga, and Ge.)

The non-oriented electrical steel sheet according to an exemplary embodiment of the present invention may include Ga: 0.0005 to 0.02 wt % and Ge: 0.0005 to 0.02 wt %.

The non-oriented electrical steel sheet according to an exemplary embodiment of the present invention may satisfy Equation 3 below.

$$3.3 \leq ([Si]+[Al]+0.5\times[Mn]) \leq 5.5 \quad \text{[Equation 3]}$$

([Si], [Al], and [Mn] respectively represent the content (% by weight) of Si, Al, and Mn.)

In the non-oriented electrical steel sheet according to an exemplary embodiment of the present invention, when XRD-testing an area of ½t to ¼t of a thickness of a steel sheet, a strength ratio of a texture may satisfy P200/(P211+P310)≥0.5. In this case, ½t means ½ of the thickness of the entire steel sheet, ¼t means ¼ of the thickness of the entire steel sheet, P200 means the strength of the diffraction peak obtained within 15 degrees of a 200 plane appearing in an XRD test, P211 means the strength of the diffraction peak obtained within 15 degrees of a 211 plane, and P310 means the peak of the diffraction strength obtained within 15 degrees of the 310 plane.

In the non-oriented electrical steel sheet according to an exemplary embodiment of the present invention, an average diameter of grains may be 50 to 95 μm.

A method for manufacturing a non-oriented electrical steel sheet according to an exemplary embodiment of the present invention includes: producing a slab including, by weight, Si: 2.0 to 3.5%, Al: 0.3 to 2.5%, Mn: 0.3 to 3.5%, Sn: 0.0030 to 0.2%, Sb: 0.0030 to 0.15%, P: 0.0040 to 0.18%, individually or in a total amount of 0.0005 to 0.03% of at least one of Ga and Ge, and a remainder including Fe and unavoidable impurities, and satisfying Equation 1; heating the slab; hot rolling the slab to produce a hot-rolled sheet; cold rolling the hot-rolled sheet to produce a cold-rolled sheet; and finally annealing the cold-rolled sheet.

$$0.05 \leq ([Sn]+[Sb])/[P] \leq 25 \quad \text{[Equation 1]}$$

([Sn], [Sb], and [P] respectively represent the content (% by weight) of Sn, Sb, and P.)

The slab may further include one or more of N: 0.0040% or less (excluding 0%), C: 0.0040% or less (excluding 0%), S: 0.0040% or less (excluding 0%), Ti: 0.0030% or less (excluding 0%), Nb: 0.0030% or less (excluding 0%), and V: 0.0040% or less (excluding 0%).

The slab may satisfy Equation 2 below.

$$0.2 \leq ([Si]+[Al]+0.5\times[Mn])/(([Ga]+[Ge])\times 1000) \leq 5.27 \quad \text{[Equation 2]}$$

([Si], [Al], [Mn], [Ga], and [Ge] respectively represent the content (% by weight) of Si, Al, Mn, Ga, and Ge.)

The slab may include Ga: 0.0005 to 0.02 wt % and Ge: 0.0005 to 0.02 wt %.

The slab may satisfy Equation 3 below.

$$3.3 \leq ([Si]+[Al]+0.5\times[Mn]) \leq 5.5 \quad \text{[Equation 3]}$$

([Si], [Al], and [Mn] respectively represent the content (% by weight) of Si, Al, and Mn.)

After producing the hot-rolled sheet, annealing the hot-rolled sheet may be further included.

In the annealing of the hot-rolled sheet, the hot-rolled sheet may be annealed at a temperature of 1050 to 1150° C.

The non-oriented electrical steel sheet produced by an exemplary embodiment of the present invention improves the texture by adding Sn, Sb, and P, and also adds the new trace-added elements of Ga and Ge to further enhance the texture.

Resultantly, the non-oriented electrical steel sheet with high magnetic permeability, high frequency iron loss, and high magnetic flux density as well as producibility may be provided.

MODE FOR INVENTION

It will be understood that, although the terms first, second, third, etc. may be used herein to describe various elements, components, regions, layers, and/or sections, they are not limited thereto. These terms are only used to distinguish one element, component, region, layer, or section from another element, component, region, layer, or section. Thus, a first component, constituent element, or section described below may be referred to as a second component, constituent element, or section, without departing from the range of the present invention.

The terminologies used herein are just used to illustrate a specific exemplary embodiment, but are not intended to limit the present invention. It must be noted that, as used in the specification and the appended claims, singular forms used herein include plural forms unless the context clearly dictates the contrary. It will be further understood that the term "comprises" or "includes", used in this specification, specifies stated properties, regions, integers, steps, operations, elements, and/or components, but does not preclude the presence or addition of other properties, regions, integers, steps, operations, elements, components, and/or groups.

When referring to a part as being "on" or "above" another part, it may be positioned directly on or above the other part, or another part may be interposed therebetween. In contrast, when referring to a part being "directly above" another part, no other part is interposed therebetween.

Unless defined otherwise, all terms including technical terms and scientific terms used herein have the same meaning as the meaning generally understood by the person with ordinary skill in the art to which the present invention belongs. The terminologies that are defined previously are further understood to have meanings that coincide with the contents that are disclosed in relating technical documents, but not having an idealized or very official meaning unless defined otherwise.

Unless otherwise stated, % means % by weight, and 1 ppm is 0.0001% by weight.

Further, in exemplary embodiments of the present invention, inclusion of an additional element means replacing remaining iron (Fe) by an additional amount of the additional elements.

The present invention will be described more fully hereinafter, in which exemplary embodiments of the invention are shown. As those skilled in the art would realize, the described embodiments may be modified in various different ways, all without departing from the spirit or scope of the present invention.

In an exemplary embodiment of the present invention, in addition to optimizing a composition in the non-oriented electrical steel sheet and a range of Si, Al, and Mn, which are additive components, an addition amount of Ga and Ge, which are trace elements, is limited, and segregation elements such as Sn, Sb, P, etc. are simultaneously controlled to significantly improve the texture and the magnetism.

The non-oriented electrical steel sheet according to an embodiment of the present invention may include, by weight, Si: 2.0 to 3.5%, Al: 0.3 to 2.5%, Mn: 0.3 to 3.5%, Sn: 0.0030 to 0.2%, Sb: 0.0030 to 0.15%, P: 0.0040 to 0.18%, individually or in a total amount of 0.0005 to 0.03% of at least one of Ga and Ge, and the remainder including Fe and unavoidable impurities.

First, the reason for limiting the components of the non-oriented electrical steel sheet is described.

Si: 2.0 to 3.5 wt %

Silicon (Si) increases the resistivity of the material to lower the iron loss. If to little Si is added, the effect of improving the high frequency iron loss may be insufficient. On the contrary, when too much Si is added, the hardness of the material may increase and the cold rolling property may be extremely deteriorated. Thus, the productivity and punching property may become poor. Therefore, Si may be added in the above-mentioned range. More specifically, Si at 2.3 to 3.3 wt % may be included.

Al: 0.3 to 2.5 wt %

Aluminum (Al) plays a role of lowering the iron loss by increasing the resistivity of the material. If too little Al is added, it may not be effective in the reduction of high frequency iron loss, and a nitride is finely formed, which may deteriorate the magnetism. On the other hand, if too much Al is added, various problems may occur in all processes such as steelmaking and continuous casting, and thus the productivity may be greatly lowered. Therefore, Al may be added in the above-mentioned range. More specifically, Al at 0.5 to 1.5 wt % may be included.

Mn: 0.3 to 3.5 wt %

Manganese (Mn) enhances the resistivity of the material to improve the iron loss and form sulfide. When too little is added, MnS may precipitate finely to deteriorate the magnetism. If too much is added, the magnetic flux density may be reduced by promoting the formation of [111] texture, which may be disadvantageous to the magnetism. Therefore, Mn can be added in the above-mentioned range. More specifically, Mn at 1 to 3.3 wt % may be included.

Sn: 0.0030 to 0.2 wt % and Sb: 0.0030 to 0.15 wt %

Tin (Sn) and antimony (Sb) may be added to improve the magnetism, as it improves the texture of the material and suppresses surface oxidation. If the addition amount of Sn and Sb is too small, the effect may be negligible. If too much Sn or Sb is added, the grain boundary segregation becomes severe, the directness of the texture decreases, and the hardness increases, which may cause a cold-rolled sheet fracture. Therefore, Sn and Sb may be added at 0.2 wt % or less and 0.1 wt % or less, respectively. When the content of Sn and Sb is 0.2 wt % or less, the cold rolling may be easily performed. More specifically, Sn at 0.005 to 0.15 wt % and Sb at 0.005 to 0.13 wt % may be included.

P: 0.0040 to 0.18 wt %

Phosphorus (P) not only serves to increase the specific resistance of the material, but also serves to improve the magnetism by segregating at the grain boundaries and improving the texture. If the addition amount of P is too small, the amount of the segregation may be too small to improve the texture. If the addition amount of P is too large, it may result in the formation of texture that is unfavorable to the magnetism, there is no effect of improving the texture, and it is excessively segregated at the grain boundaries, thereby deteriorating the rollability and making the production difficult. More specifically, P at 0.007 to 0.17 wt % may be included.

Ga and Ge: 0.0005 to 0.03 wt %

Gallium (Ga) and germanium (Ge) are segregated on the surface and grain boundaries of the steel sheet, thereby suppressing surface oxidation during annealing and improving the texture. In an exemplary embodiment of the present invention, at least one of Ga and Ge may be included. That is, Ga alone may be included, Ge alone may be included, or Ga and Ge may be included at the same time. When Ge alone is included, 0.0005 to 0.03% by weight of Ge may be included. When Ga alone is included, 0.0005 to 0.03% by weight of Ga may be included. When Ga and Ge are included at the same time, the total amount of Ga and Ge may be 0.0005 to 0.03% by weight. If too little of at least one of Ga and Ge is added, there is no such effect. If too much is added, it is segregated in the grain boundaries to deteriorate the toughness of the material, thereby decreasing the productivity against magnetic improvement. Specifically, Ga and Ge may be included at the same time. Further, 0.0005 to 0.02% by weight of Ga and 0.0005 to 0.02% by weight of Ge may be included. More specifically, 0.0005 to 0.01% by weight of Ga and 0.0005 to 0.01% by weight of Ge may be contained.

N: 0.0040% by weight or less

Nitrogen (N) not only forms fine and long AlN precipitates inside the base material, but also forms fine a nitride by binding with other impurities to inhibit grain growth and deteriorate iron loss. Thus, it may be preferably limited to 0.0040 wt % or less, more specifically 0.0030 wt % or less.

C: 0.0040% by weight or less

Carbon (C) causes self-aging and binds with other impurity elements to generate a carbide to degrade the magnetic properties. Thus, it may be preferably limited to 0.0040% by weight or less, more specifically 0.0030% by weight or less.

S: 0.0040% by weight or less

Sulfur (S) reacts with Mn to form a sulfide such as MnS to reduce grain growth and suppress the migration of the magnetic domain. Thus, it may be preferably limited to 0.0040 wt % or less. More specifically, it may be preferably limited to 0.0030 wt % or less.

Ti: 0.0030 wt % or less

Titanium (Ti) plays a role of suppressing grain growth and magnetic domain formation by forming a carbide or nitride. Thus, it may be preferably limited to 0.0030 wt % or less, more specifically 0.0020 wt % or less.

Nb: 0.0030 wt % or less

Niobium (Nb) plays a role of suppressing the grain growth and the magnetic domain formation by forming a carbide or nitride. Thus, it may be preferably limited to 0.0030 wt % or less, more specifically 0.0020 wt % or less.

V: 0.0030 wt % or less

Vanadium (V) plays a role of suppressing the grain growth and the magnetic domain formation by forming a carbide or nitride. Thus, it may be preferably limited to 0.0030 wt % or less, more specifically 0.0020 wt % or less.

Other Impurities

Unavoidable impurities such as Mo, Mg, Cu, and the like may be included in addition to the above-mentioned elements. Although these elements are included in trace amounts, they may cause deterioration of magnetism through the formation of inclusions in the steel. Therefore, it should be controlled as follows: Mo and Mg: not more than 0.005 wt %, respectively, and Cu: not more than 0.025 wt %.

The non-oriented electrical steel sheet according to an exemplary embodiment of the present invention satisfies Equation 1 below.

$$0.05 \leq ([Sn]+[Sb])/[P] \leq 25 \quad \text{[Equation 1]}$$

([Sn], [Sb], and [P] respectively represent the content (% by weight) of Sn, Sb, and P.)

When the value of Equation 1 is less than 0.05, the segregation of P is excessive and a <111> direction which is disadvantageous to the magnetic property promotes the formation of the texture (hereinafter referred to as a <111>// ND texture) disposed parallel to the normal direction (an ND direction) of the steel sheet rolling surface within 15 degrees so that the magnetism may be deteriorated. When the value of Equation 1 exceeds 25, the growth of the grains is deteriorated, so there is no effect of improving the texture and the annealing temperature is too high, so the annealing productivity may be deteriorated.

The non-oriented electrical steel sheet according to an exemplary embodiment of the present invention may satisfy Equation 2 below.

$$0.2 \leq ([Si]+[Al]+0.5 \times [Mn])/(([Ga]+[Ge]) \times 1000) \leq 5.27 \quad \text{[Equation 2]}$$

([Si], [Al], [Mn], [Ga], and [Ge] respectively represent the content (% by weight) of Si, Al, Mn, Ga, and Ge.)

When the value of Equation 2 is less than 0.2, the effect of adding Ga and Ge is negligible, so that the magnetism may be deteriorated. When the value of Equation 2 exceeds 5.27, the texture may be deteriorated due to the addition of a large amount of Ga and Ge, and the saturated magnetic flux density decreases, so the high frequency magnetic improvement effect may be eliminated.

The non-oriented electrical steel sheet according to an exemplary embodiment of the present invention may satisfy Equation 3 below.

$$3.3 \leq ([Si]+[Al]+0.5\times[Mn]) \leq 5.5 \quad \text{[Equation 3]}$$

([Si], [Al], and [Mn] respectively represent the content (% by weight) of Si, Al, and Mn.)

When the value of Equation 3 described above is satisfied, the cold rolling property may be secured.

In an exemplary embodiment of the present invention, a certain amount of the segregation element such as Sn, Sb, and P, and Ga and Ge, is added to improve the texture. More specifically, when XRD-testing the area of ½t to ¼t of the thickness of the steel sheet, the strength ratio of the texture may satisfy P200/(P211±P310) ≥0.5. In this case, ½t means ½ of the thickness of the entire steel sheet, ¼t means ¼ of the thickness of the entire steel sheet, P200 means the strength of the diffraction peak obtained within 15 degrees of a 200 plane appearing in an XRD test, P211 means the strength of the diffraction peak obtained within 15 degrees of a 211 plane, and P310 means the peak of the diffraction strength obtained within 15 degrees of a 310 plane. The texture (i.e., <200>//ND) in which the <200> direction lies parallel to the vertical direction of the rolling surface of the steel sheet within 15 degrees includes the axis of the easy magnetization, and thus, the larger the ratio is, the more favorable the magnetism is. Also, the texture (i.e., <211>//ND) in which the <211> direction lies parallel to the vertical direction of the rolling surface of the steel sheet within 15 degrees and the texture (i.e., <310>//ND) in which the <310> direction lies parallel to the vertical direction of the rolling surface of the steel sheet within 15 degrees are close to the axis of hard magnetization, and thus, the smaller the ratio is, the more favorable the magnetism is. In the embodiment of the present invention, the magnetic improvement effect may be obtained in the low magnetic field region through the improved texture. Further, it may play a key role in improving the high frequency iron loss.

The non-oriented electrical steel sheet according to an exemplary embodiment of the present invention may have an average diameter of grains of 50 to 95 μm. The high-frequency iron loss is excellent in the above-mentioned range.

The non-oriented electrical steel sheet according to an exemplary embodiment of the present invention has improved magnetic permeability and coercive force and is suitable for high-speed rotation. As a result, when applied to motors of eco-friendly automobiles, it can contribute to improvement in mileage. Specifically, the non-oriented electrical steel sheet according to an embodiment of the present invention has magnetic permeability at 100 A/m of 8000 or more and a coercive force at B=2.0 T of 40 A/m or less.

The non-oriented electrical steel sheet according to an exemplary embodiment of the present invention may have resistivity of 55 to 75 μΩ·cm. If the resistivity is too high, the magnetic flux density may be deteriorated and become unsuitable for a motor.

A manufacturing method of the non-oriented electrical steel sheet according to an exemplary embodiment of the present invention may include: producing a slab including, by weight, Si: 2.0 to 3.5%, Al: 0.3 to 2.5%, Mn: 0.3 to 3.5%, Sn: 0.0030 to 0.2%, Sb: 0.0030 to 0.15%, P: 0.0040 to 0.18%, individually or in a total amount of 0.0005 to 0.03% of at least one of Ga and Ge, and the remainder including Fe and unavoidable impurities, and satisfying Equation 1 and Equation 2 below; heating the slab, hot rolling the slab to produce a hot-rolled sheet, cold rolling the hot-rolled sheet to produce a cold-rolled sheet; and finally annealing the cold-rolled sheet.

$$0.2 \leq ([Si]+[Al]+0.5\times[Mn])/(([Ga]+[Ge])\times 1000) \leq 5.27 \quad \text{[Equation 1]}$$

$$0.05 \leq (Sn+Sb)/P \leq 25 \quad \text{[Equation 2]}$$

([Si], [Al], [Mn], [Sn], [Sb], [P], [Ga], and [Ge] respectively represent the content (% by weight) of Si, Al, Mn, Sn, Sb, P, Ga, and Ge.)

First, the slab is produced. Since the reason why the addition ratio of each composition in the slab is limited is the same as the reason for limiting the composition of the non-oriented electrical steel sheet which is mentioned above, the repeated description is omitted. The composition of the slab is substantially the same as that of the non-oriented electrical steel sheet since it does not substantially change during the manufacturing process such as hot rolling, annealing the hot rolled sheet, cold rolling, and final annealing and the like which will be described later.

The slab may be produced by adding a Si ferro alloy, an Al ferro alloy, and a Mn ferro alloy to the molten steel, adding at least one of Ga and Ge to the molten steel, and adding Sn, Sb, and P for continuous casting. The Si ferro alloy, Al ferro alloy, Mn ferro alloy, Ga, Ge, Sn, Sb, P, and the like may be adjusted to be added so as to correspond to the composition range of the above-mentioned slab.

Next, the slab is heated. In detail, the slab is inserted into a heating furnace and heated at 1100 to 1250° C. If heated at a temperature which exceeds 1250° C., the precipitate is dissolved again and may be finely precipitated after hot rolling.

The heated slab is hot rolled to 2 to 2.3 mm to manufacture a hot rolled sheet. In the step of manufacturing the hot rolled sheet, the finishing temperature may be 800 to 1000° C.

After the step of manufacturing the hot rolled sheet, the step of annealing the hot rolled sheet may be further included. In this case, the hot-rolled sheet annealing temperature is adjusted to 1050 to 1150° C. to increase crystal orientation that is desirable for magnetism. When the hot-rolled sheet annealing temperature is less than 1050° C., the aggregation sufficiently occurs, but the increasing effect of the magnetic flux density is less because the strength of the 211 plane, which is disadvantageous to the magnetism, is stronger than the strength of the 200 plane, which is favorable for the magnetism, When the annealing temperature exceeds 1150° C., the strength of the 211 plane increases again, resulting in a deteriorated magnetic characteristic, and the rolling workability may deteriorate due to the deformation of the plate shape, so the temperature range is limited to the range from 1050 to 1150° C. Within this temperature range, the plane strength of 200 is stronger than that of 211, so the texture is improved. The hot-rolled sheet annealing is performed to increase the orientation that is favorable to the magnetic property as necessary and may be omitted.

Next, the hot rolled sheet is pickled and cold rolled to have a predetermined sheet thickness. It may be applied depending on the thickness of the hot rolled sheet, however it may be cold rolled to a final thickness of 0.2 to 0.65 mm by applying a percentage reduction in thickness of 70 to 95%.

The cold rolled sheet which is finally cold rolled is subjected to final annealing so that the average grain diameter is 50 to 95 μm. The final annealing temperature may be 750 to 1050° C. If the final annealing temperature is too low, recrystallization does not sufficiently occur, and if the final annealing temperature is too high, the rapid growth of crystal grains occurs, and magnetic flux density and high-frequency iron loss may become inferior. More specifically, it may be subjected to final annealing at a temperature of 900 to 1000° C. In the final annealing process, all the processed structure formed in the cold rolling step which is the previous step may be recrystallized (i.e., 99% or more).

The following examples illustrate the present invention in more detail. However, these examples are only for illustrating the present invention, and the present invention is not limited thereto.

EXAMPLE

Slabs were produced as shown in the following Table 1. All of the elements other than those shown in Table 1 such as C, S, N, Ti, Nb, V, and the like were controlled to 0.003 wt %. The slab was heated at 1150° C., and finishing hot rolled at 850° C. to produce the hot rolled sheet having thickness of 2.0 mm. The hot rolled sheet was annealed at 1100° C. for 4 minutes and then pickled. Thereafter, it was cold rolled to a thickness of 0.25 mm, and final annealing was performed at the temperature of 1000° C. for 38 seconds. The magnetic properties were determined by the average value of rolling direction and vertical direction using a Single Sheet tester and are shown in the following Table 2. The magnetic permeability is the magnetic permeability at 100 A/m and the coercive force is the coercive force at B=2.0 T. For the texture, the steel sheet was cut to ½t and an XRD (X-ray diffraction) test method was used to calculate the strength of each plane.

TABLE 1

| Item | Si | Al | Mn | Ga | Ge | Ga + Ge | Sn | Sb | P DELETEDTEXTS |
|---|---|---|---|---|---|---|---|---|---|
| Example 1 | 2.5 | 1 | 2 | 0.002 | 0.005 | 0.007 | 0.01 | 0.01 | 0.01 |
| Comparative Example 1 | 2.5 | 1 | 2 | 0.005 | 0.005 | 0.01 | 0.25 | 0.05 | 0.05 |
| Comparative Example 2 | 2.5 | 1 | 2 | 0.006 | 0.005 | 0.011 | 0.003 | 0.003 | 0.14 |
| Example 2 | 2.5 | 1 | 2 | 0.001 | 0.005 | 0.006 | 0.1 | 0.1 | 0.15 |
| Comparative Example 3 | 3.2 | 0.7 | 3 | 0.004 | 0.005 | 0.009 | 0.1 | 0.1 | 0.004 |
| Comparative Example 4 | 3.2 | 0.7 | 3 | 0.006 | 0.005 | 0.011 | 0.05 | 0.2 | 0.1 |
| Comparative Example 5 | 3.2 | 0.7 | 3 | 0.001 | 0.004 | 0.005 | 0.03 | 0.03 | 0.2 |
| Example 3 | 3.2 | 0.7 | 3 | 0.002 | 0.005 | 0.007 | 0.08 | 0.01 | 0.01 |
| Comparative Example 6 | 3.2 | 0.7 | 3 | 0.0002 | 0.0002 | 0.0004 | 0.01 | 0.01 | 0.01 |

TABLE 2

| Items | Equation 1 value | Equation 2 value | Equation 3 value | Resistivity (μ Ω · cm) | P200/ (P211 + P310) DELETEDTEXTS | Magnetic permeability |
|---|---|---|---|---|---|---|
| Example 1 | 2 | 0.64 | 4.5 | 64 | 0.7 | 10,200 |
| Comparative Example 1 | 6 | 0.45 | 4.5 | 64 | 0.48 | 7500 |
| Comparative Example 2 | 0.04 | 0.41 | 4.5 | 64 | 0.49 | 7800 |
| Example 2 | 1.33 | 0.75 | 4.5 | 64 | 0.65 | 9500 |
| Comparative Example 3 | 50 | 0.6 | 5.4 | 74 | 0.47 | 7900 |
| Comparative Example 4 | 3 | 0.49 | 5.4 | 74 | 0.48 | 7500 |
| Comparative Example 5 | 0.3 | 1.08 | 5.4 | 74 | 0.46 | 7200 |
| Example 3 | 9 | 0.77 | 5.4 | 74 | 0.75 | 11,000 |
| Comparative Example 6 | 2 | 13.5 | 5.4 | 74 | 0.45 | 7500 |

As shown in Table 1 and Table 2, in the case of the inventive steels, the aggregation was improved, the magnetic permeability was large, and the coercive force was small. On the other hand, in the case of the comparative steels in which the amounts of addition amount of Ga, Ge, Sn, Sb, and P were outside the range of the present invention, the aggregation was not improved, so that the magnetic permeability and the coercive force were weakened.

It will be understood by those of ordinary skill in the art that various changes in form and details may be made therein without departing from the spirit and scope of the present invention as defined by the following claims and their equivalents. It is therefore to be understood that the above-described embodiments are illustrative in all aspects and not restrictive.

The invention claimed is:

1. A non-oriented electrical steel sheet comprising, by weight,
   Si: 2.0 to 3.5%,
   Al: 0.3 to 2.5%,
   Mn: 0.3 to 3.5%,
   Sn: 0.0030 to 0.2%,
   Sb: 0.0030 to 0.15%,
   P: 0.0040 to 0.18%,
   Ga: 0.0005 to 0.02%,
   Ge: 0.0005 to 0.02% such that a total amount of Ga and Ge is 0.001 to 0.03%, and
   a remainder including Fe and unavoidable impurities, and satisfying Equations 1 to 3 below:

$$0.05 \leq ([Sn]+[Sb])/[P] \leq 25 \quad [\text{Equation 1}]$$

$$0.2 \leq ([Si]+[Al]+0.5\times[Mn])/(([Ga]+[Ge])\times 1000) \leq 5.27 \quad [\text{Equation 2}]$$

$$3.3 \leq ([Si]+[Al]+0.5\times[Mn]) \leq 5.5 \quad [\text{Equation 3}]$$

where [Si], [Al], [Mn], [Ga], [Ge], [Sn], [Sb], and [P] respectively represent the content, % by weight, of Si, Al, Mn, Ga, Ge, Sn, Sb, and P,
wherein the steel sheet has a texture satisfying a strength ratio of P200/(P211+P310) ≥0.5 as tested by XRD-testing an area of ½t to ¼t of a thickness of the steel sheet,
where ½t refers to ½ of the thickness of the entire steel sheet,
¼t refers to ¼ of the thickness of the entire steel sheet,
P200 refers to a strength of a diffraction peak obtained within 15 degrees of a 200 plane appearing in the XRD test,
P211 refers to a strength of a diffraction peak obtained within 15 degrees of a 211 plane, and
P310 refers to a peak of a diffraction strength obtained within 15 degrees of a 310 plane.

2. The non-oriented electrical steel sheet of claim 1, further comprising
   one or more of N: 0.0040% or less, excluding 0%,
   C: 0.0040% or less, excluding 0%,
   S: 0.0040% or less, excluding 0%,
   Ti: 0.0030% or less, excluding 0%,
   Nb: 0.0030% or less, excluding 0%, and
   V: 0.0040% or less, excluding 0%.

3. The non-oriented electrical steel sheet of claim 1, wherein an average diameter of grains is 50 to 95 μm.

4. The non-oriented electrical steel sheet of claim 1, comprising, by weight, Mn: 1 to 3.5%.

5. The non-oriented electrical steel sheet of claim 1, wherein Ga: 0.001 to 0.02 wt % and Ge: 0.005 to 0.02 wt % are included.

6. The non-oriented electrical steel sheet of claim 1, consisting of, by weight,
   Si: 2.0 to 3.5%,
   Al: 0.3 to 2.5%,
   Mn: 0.3 to 3.5%,
   Sn: 0.0030 to 0.2%,
   Sb: 0.0030 to 0.15%,
   P: 0.0040 to 0.18%,
   Ga: 0.0005 to 0.02%,
   Ge: 0.0005 to 0.02% such that a total amount of Ga and Ge is 0.001 to 0.03%, and a remainder including Fe and unavoidable impurities.

7. A method for manufacturing the non-oriented electrical steel sheet of claim 1, comprising:
   producing a slab including, by weight, Si: 2.0 to 3.5%, Al: 0.3 to 2.5%, Mn: 0.3 to 3.5% %, Sn: 0.0030 to 0.2%, Sb: 0.0030 to 0.15%, P: 0.0040 to 0.18,
   Ga: 0.0005 to 0.02% Ge: 0.0005 to 0.02% such that a total amount of Ga and Ge is 0.001 to 0.03%, and a remainder including Fe and unavoidable impurities, and satisfying Equation 1;
   heating the slab;
   hot rolling the slab to produce a hot-rolled sheet;
   cold rolling the hot-rolled sheet to produce a cold-rolled sheet; and
   finally annealing the cold-rolled sheet:

$$0.05 \leq ([Sn]+[Sb])/[P] \leq 25 \quad [\text{Equation 1}]$$

(({Sn], [Sb], and [P] respectively represent the content (% by weight) of Sn, Sb, and P); thereby producing the non-oriented electrical steel sheet of claim 1.

8. The method for manufacturing the non-oriented electrical steel sheet of claim 7, wherein
   the slab further includes one or more of N: 0.0040% or less (excluding 0%), C: 0.0040% or less (excluding 0%), S: 0.0040% or less (excluding 0%), Ti: 0.0030% or less (excluding 0%), Nb: 0.0030% or less (excluding 0%), and V: 0.0040% or less (excluding 0%).

9. The method for manufacturing the non-oriented electrical steel sheet of claim 7, wherein
   the slab satisfies Equation 2 below:

$$0.2 \leq ([Si]+[Al]+0.5\times[Mn])/(([Ga]+[Ge])\times 1000) \leq 5.27 \quad [\text{Equation 2}]$$

([Si], [Al], [Mn], [Ga], and [Ge] respectively represent the content (% by weight) of Si, Al, Mn, Ga, and Ge.).

10. The method for manufacturing the non-oriented electrical steel sheet of claim 7, wherein
    the slab satisfies Equation 3 below:

$$3.3 \leq ([Si]+[Al]+0.5\times[Mn]) \leq 5.5 \quad [\text{Equation 3}]$$

([Si], [Al], and [Mn] respectively represent the content (% by weight) of Si, Al, and Mn.).

11. The method for manufacturing the non-oriented electrical steel sheet of claim 7, further comprising
    after producing the hot-rolled sheet,
    annealing the hot-rolled sheet.

12. The method for manufacturing the non-oriented electrical steel sheet of claim 11, wherein
    in the annealing of the hot-rolled sheet, the hot-rolled sheet is annealed at a temperature of 1050 to 1150° C.

* * * * *